C. Perley,
Cargo Port.
No. 14,113.  Patented Jan. 15, 1856.
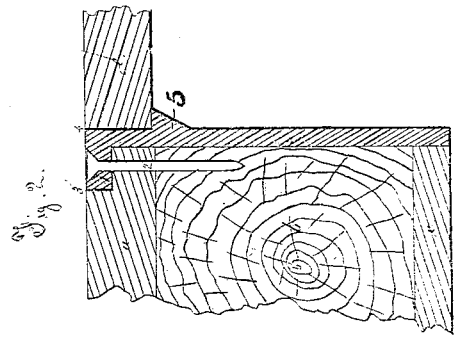
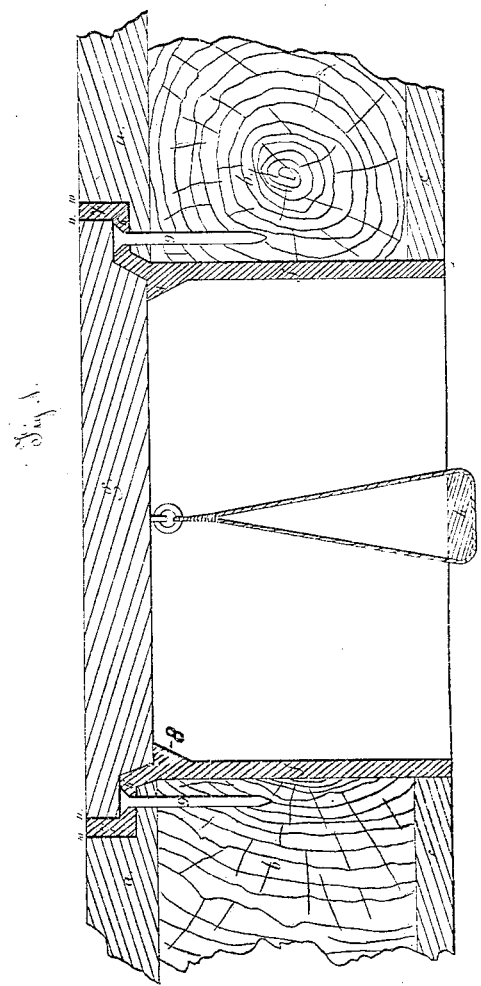
Witnesses
Lemuel W. Serrell
Thomas G. Harold
Charles Perley

UNITED STATES PATENT OFFICE.

CHAS. PERLEY, OF NEW YORK, N. Y.

CARGO-PORT FOR SHIPS AND OTHER VESSELS.

Specification of Letters Patent No. 14,113, dated January 15, 1856.

*To all whom it may concern:*

Be it known that I, CHARLES PERLEY, of the city, county, and State of New York, have invented, made, and applied to use a new and useful Improvement in Cargo-Ports for Vessels; and I do hereby declare that the following is a full, clear, and exact description of the construction and operation of the same, reference being had to the annexed drawing, making part of this specification, wherein—

Figure 1, is a horizontal section of my improved cargo part, and Fig. 2, is a section of one side of the ordinary frame that is made use of in cargo ports, in order to show the differences which exist between the same and my improvements.

In vessels of different characters, particularly large sized sea going vessels, openings are made in the side at convenient places for the receipt and delivery of goods, called cargo ports, and these vary in size according to the purpose for which they are to be used, and their shape is adapted to the vessel, and generally square.

In Fig. 2, $a$, is the outside planking of the vessel, $b$ the timbers, and $c$, the interior planking, $d$, is the metallic frame around the port with a flanch 1, secured by bolts 2, and calked as at 3. $e$, is the shutter calked at the point 4, and resting against a rib 5. In this form of construction the bolts 2, very often leak because they cannot be calked and thereby damage arises to the cargo, for in sea going vessels where the waves dash against the ports, leakage from the bolts is often very considerable. To avoid this difficulty various methods have been resorted to and have not succeeded because either the port frame was not secured firmly in place, or facility was not provided for the necessary depth of calking, or else that the ends of the planking were not firmly retained by the metal frame. My invention overcomes all these difficulties and furnishes facilities for calking the port perfectly tight which have never before been provided.

In Fig. 1, the planking $a$, and $c$, and timbers $b$, are shown the same as in Fig. 2, $f$ is the metal frame of the desired size and shape, and adapted to the vessel's side. 6 is a flanch turned off at right angles to the frame $f$, and 7 is a rim around the edge of said flanch 6, which rim strengthens the said flanch 6, avoiding the necessity for said flanch being as thick as the flanch 1. In this flanch 6, holes are made receiving the bolts 9, which firmly secure the same into the side of the vessel, and said port frame also retains the ends of the plank as shown. A calking is now to be driven around the outside of the rim 7 as at 10, and the frame is permanently secured into place. $g$, is a shutter formed to fit the flanches 6 and 7, and to rest against the rib 8, and said shutter is represented as retained by the usual sizing or lashing around a cross bar $h$. This shutter it will be seen incloses the bolts 9, so that it matters not whether they are tight or not so long as the shutter $g$, is calked at the point 11, against the inside of the flanch 7, which calking also tends to make the calking 10, all the tighter; thereby the possibility of any leakage is prevented, the bolts are covered from the action of water to cause leakage or rust, an excellent opportunity is afforded for driving the calking well home and solid to the flanch 6 both inside and outside the rim 7 and the two calkings tend to tighten each other.

What I claim and desire to secure by Letters Patent is—

The rim 7, around the flanch 6, that receives the bolts 9, to secure the frame $f$, to the vessel; said rim 7 receiving a calking on both sides, one against the vessel and the other against the shutter $g$, thereby effectually preventing leakage in the manner and as specified.

In witness whereof I have hereunto set my signature this thirty-first day of December 1855.

CHARLES PERLEY.

Witnesses:
LEMUEL W. SERRELL,
THOMAS G. HAROLD.